Nov. 7, 1933.  M. WIMER  1,933,834
MACHINE FOR MAKING RINGS
Filed April 4, 1932  4 Sheets-Sheet 4
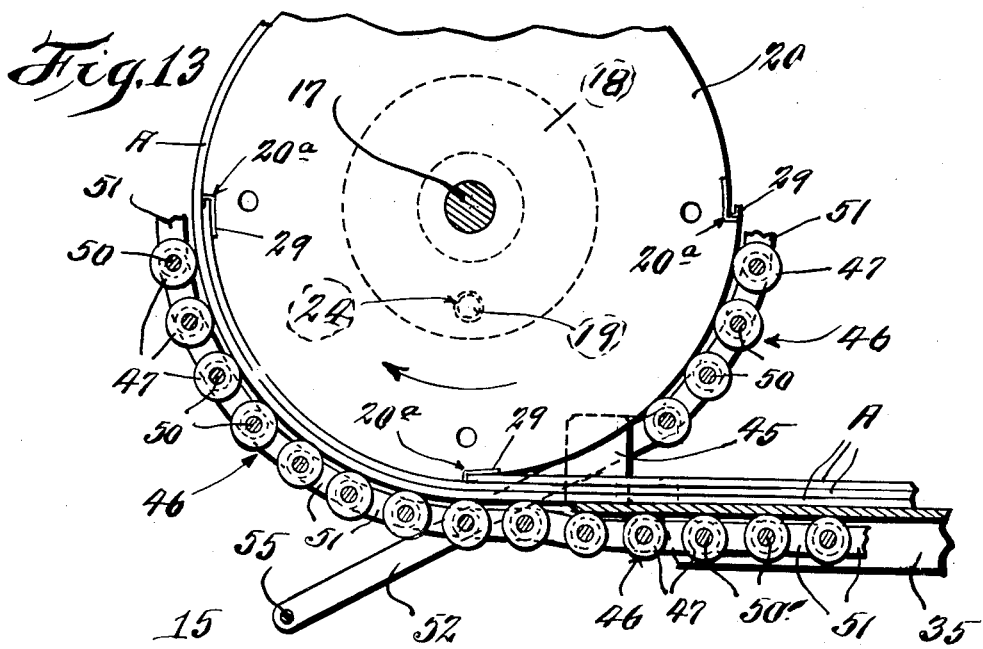
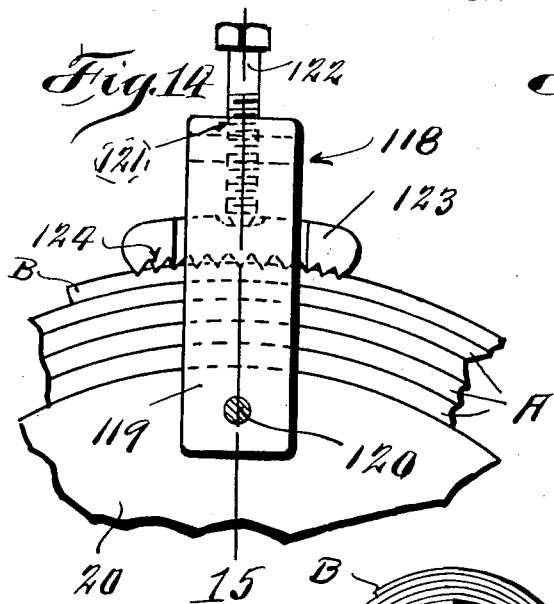
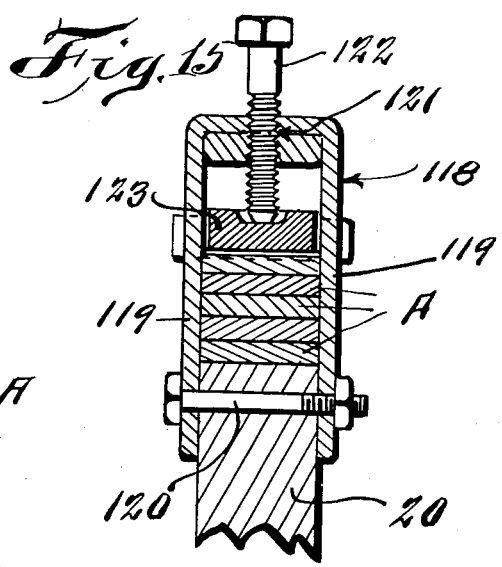
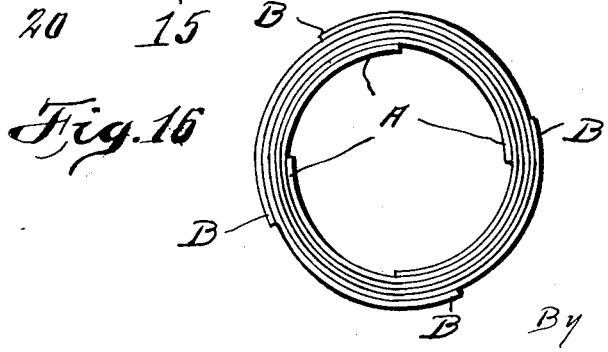
INVENTOR
Michael Wimer
By William Jannus
Atty.

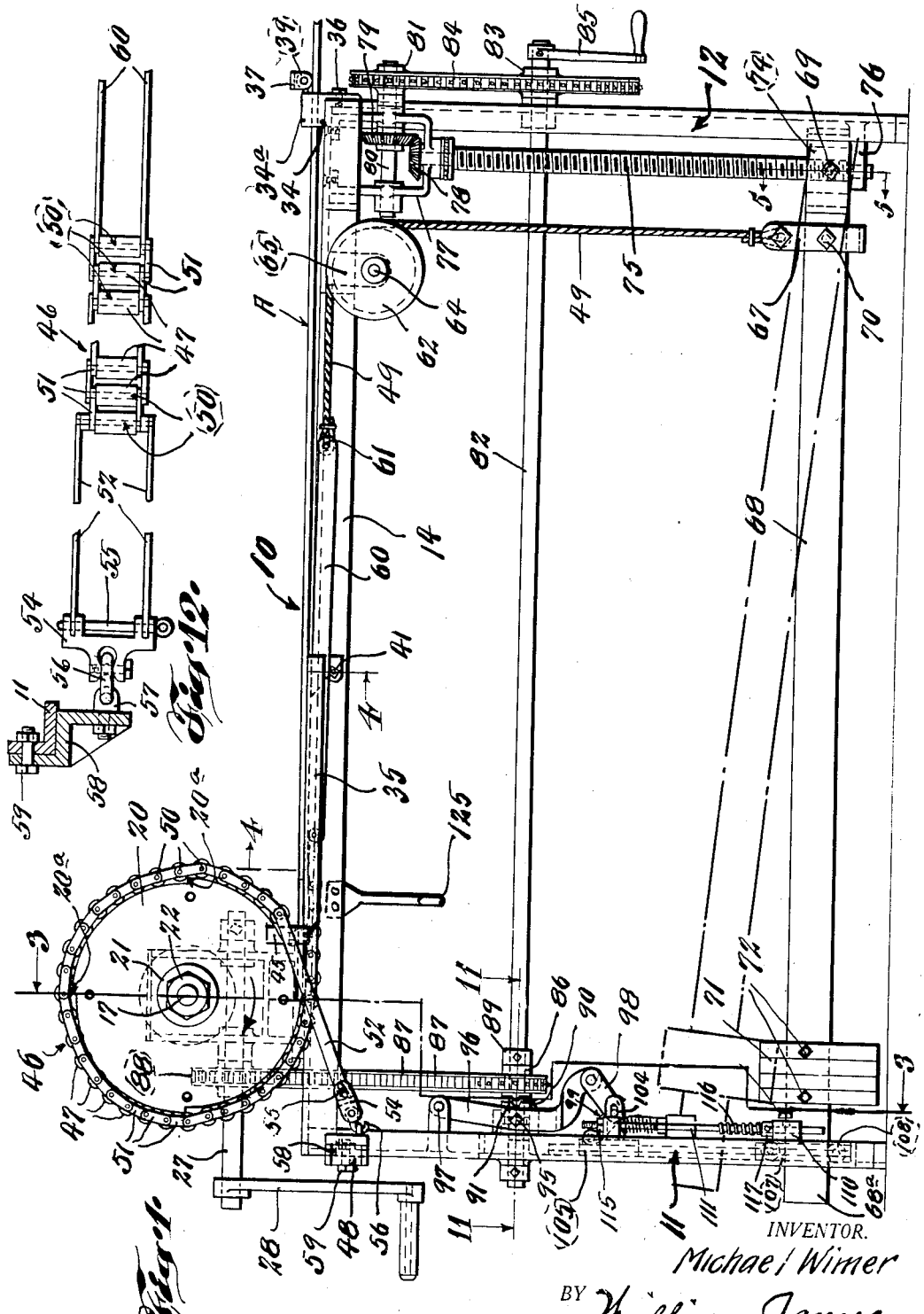

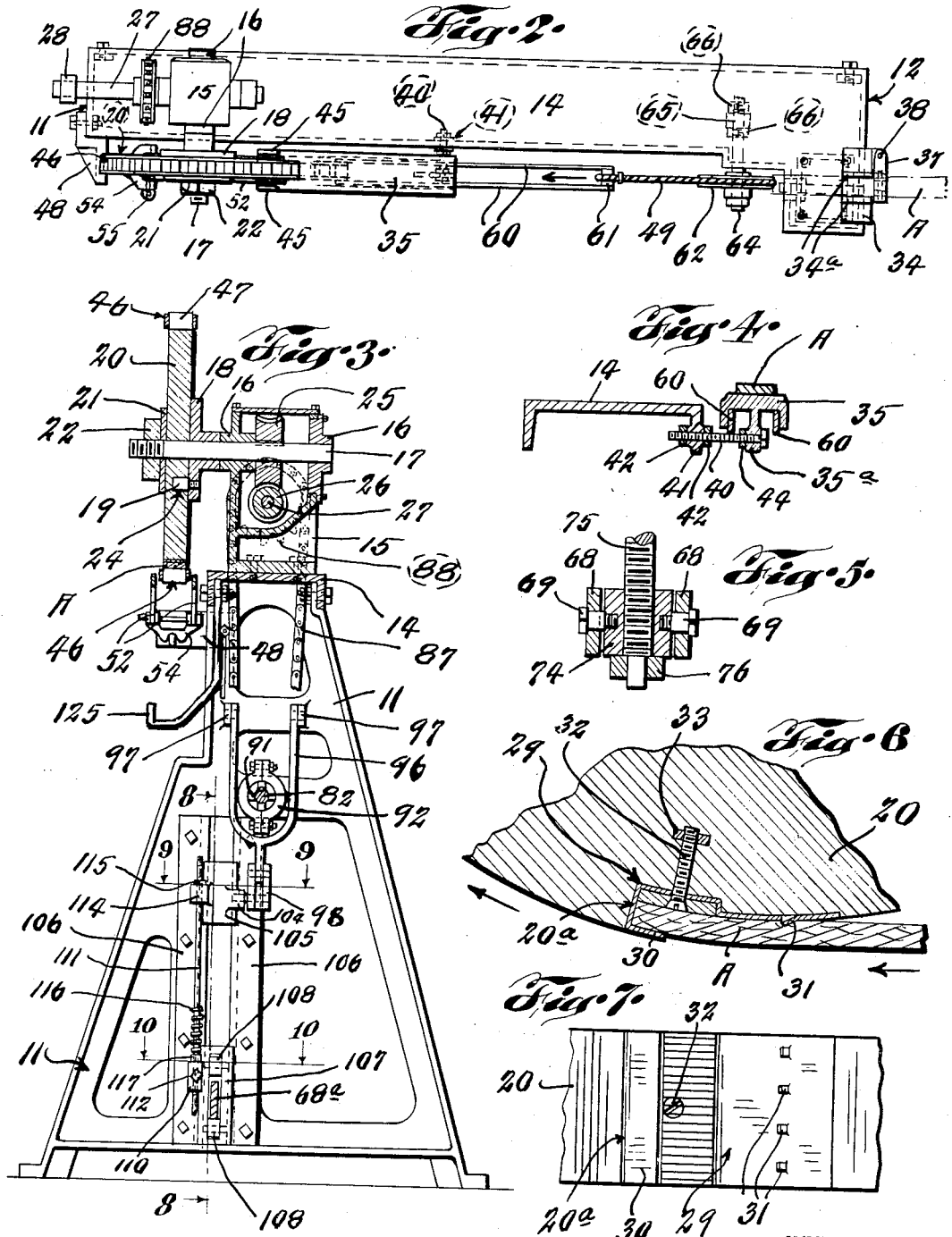

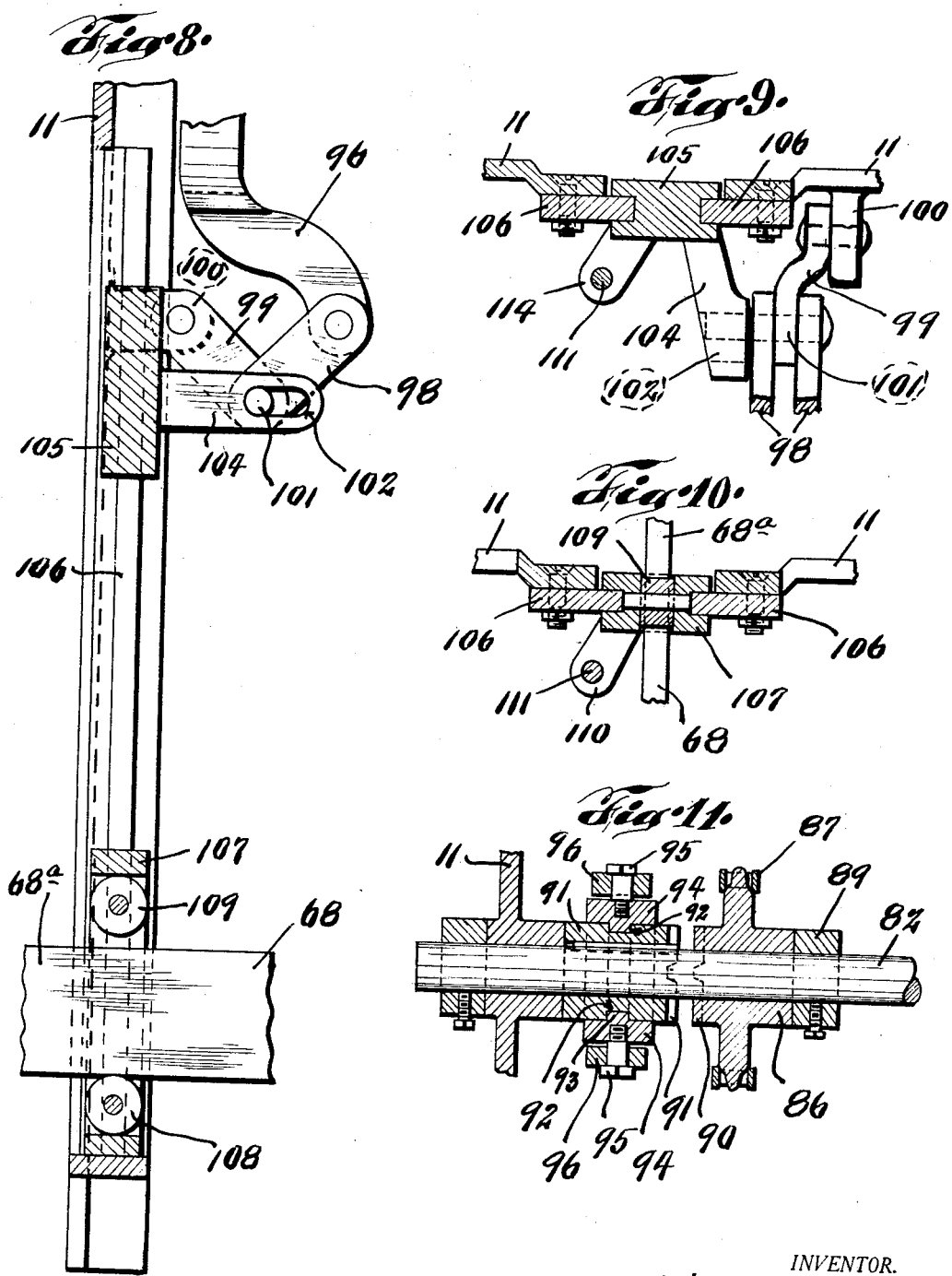

Patented Nov. 7, 1933

1,933,834

UNITED STATES PATENT OFFICE 1,933,834

MACHINE FOR MAKING RINGS

Michael Wimer, St. Louis, Mo.

Application April 4, 1932. Serial No. 603,039

16 Claims. (Cl. 144—268)

This invention relates to machines for making rings and the like by coiling strips of pliable material, such as wood.

The chief objects of the invention are to provide a machine wherein a strip of wood or other material is wound in layers or convolutions on a rotatable forming head or mandrel under pressure which is applied peripherally to the outermost layer or convolution of the strip by a plurality of spaced rollers which are carried by a suitable chain and encircles the entire periphery of the forming head. One end of this chain is fixed and the other is held under tension so as to produce the proper degree of pressure against the coiled strip, said tensioned end of the chain being adjustable or movable inwardly in accordance with the increase in diameter of the chain portion encircling the forming head and strips wound thereon.

Further objects of the invention are to provide in combination with the forming head or mandrel a flexible member encircling said head and having one end fixed and having the other end attached to a weighted lever whereby the latter holds said flexible member under tension so that the proper degree of pressure is applied to the peripheral face of the forming head, said weighted lever being movable or adjustable in accordance with the movement of the free end of the flexible member toward said head as the diameter of the forming head increases due to the convolutions of the strip applied thereon.

Still further objects of the invention are to provide a ring forming machine having a revoluble forming head and a flexible pressure member operating over the peripheral face thereof and shaping the wood strip under pressure against the contour of the head, one end of said flexible pressure member being stationarily anchored and the other being fixed to a weighted lever, the latter having its fulcrum movable at predetermined times in correlation with the operation of said forming head, thereby maintaining said flexible pressure member under tension at all times and producing uniform pressure against the strip wound on said forming head irrespective of the variations in the diameter thereof.

Other objects of the invention are to provide a rotatable forming head detachably mounted and having its peripheral face provided with one or more seats or grips for engaging one end of a wood strip and holding it in place while the forming head is rotated and said strip is wound thereon.

Still other objects of the invention are to provide a clamp attachable to the forming head and engageable with the outer end of a wood strip wound on said head for holding said outer end in position under pressure.

Still other objects of the invention are to provide a flexible member for encircling the peripheral face of a forming head and shaping thereover under pressure a strip of wood, one end of said flexible member being held stationary while the other is connected to a weighted lever which latter places said member under proper tension and causes it to exert the necessary pressure against said strip, said weighted member being automatically adjustable in accordance with the movement of the tensioned end of the flexible member toward the forming head as the peripheral face of the strip wound on said forming head increases.

Additional objects of the invention are to provide in combination with a flexible member a weighted lever connected to the free end of the latter for maintaining it under tension and to mount the fulcrum of said lever on a vertically disposed screw and to provide automatic means for actuating said screw and raising said fulcrum when the weighted end of the lever is raised to its uppermost position, thereby obtaining maximum effectiveness of the lever within a restricted space.

With these and other objects in view, my invention consists in certain novel features of construction and arrangement of parts, hereinafter more fully described and claimed, and illustrated in the accompanying drawings, in which—

Figure 1 is a side elevational view of my improved forming machine.

Figure 2 is a reduced top plan view thereof.

Figure 3 is a vertical cross section taken on line 3—3 of Figure 1.

Figure 4 is an enlarged detail cross section taken on line 4—4 of Figure 1.

Figure 5 is an enlarged detail cross section taken on line 5—5 of Figure 1.

Figure 6 is an enlarged detail cross section of a portion of the forming head.

Figure 7 is a bottom plan view thereof.

Figure 8 is an enlarged detail cross section taken on line 8—8 of Figure 3.

Figure 9 is an enlarged horizontal cross section taken on line 9—9 of Figure 3.

Figure 10 is an enlarged detail cross section taken on line 10—10 of Figure 3.

Figure 11 is an enlarged horizontal cross section taken on line 11—11 of Figure 1.

Figure 12 is an enlarged top plan view, partly broken away, of the chain or flexible member and showing the means of anchoring one end thereof.

Figure 13 is an enlarged detail view of the forming head and the flexible member used in conjunction therewith.

Figure 14 is an enlarged detail view showing the plan used to secure the outer end of the strip in position.

Figure 15 is a vertical cross section taken on line 15—15 of Figure 14.

Figure 16 is a side elevational view of one of the rings formed by my machine before receiving finishing operations.

Referring my numerals to the accompanying drawings, 10 indicates a frame comprising front and rear end members 11 and 12, respectively, and a horizontally disposed top rail 14. The latter is secured to and extends between said frame members. A support 15 is arranged on rail 14 adjacent to the front end member 11. This support is provided with a pair of spaced bearings 16 disposed transversely and above said rail and having journaled therein a horizontally disposed shaft 17. One end of said shaft projects forwardly and has fixed thereon a hub 18. A pin 19 is fixed to said hub and projects laterally therefrom parallel with said shaft 17. A forming head 20 is detachably arranged on said shaft and has one side bearing against said hub while the other side is engaged by a washer 21 against which bears a nut 22 which latter is screw-seated on the threaded end of said shaft. Thus said forming head is clamped in position by tightening said nut 22. The corresponding side of forming head 20 is provided with an aperture or seat 24 which when said forming head is in position is engaged by a pin 19 thereby holding said forming head against rotative movement relatively to said shaft.

A worm gear 25 is fixed on said shaft 17 intermediate said bearings 16 and engaging said worm gear is a worm 26 which is fixed to a shaft 27. This shaft is journaled in support 15 below and at right angle to shaft 17. The forward end of said shaft extends outwardly a suitable distance beyond the front end member 11 and receives a handle 28 whereby said shaft and parts associated therewith can be manually operated. If it is desired to operate the machine by a motor, handle 28 can be replaced by a pulley or suitable gearing for receiving the motor driving connections.

The forming head 20 may be of any desired shape and size, depending on the ring or other similarly shaped object which it is desired to form from the strip. In the instant case the form is circular and as the ring is to be formed of four strips the peripheral face of the head is provided with four shoulders 20a. Each shoulder is of a depth substantially equivalent to the thickness of the strip. A vise or retainer 29 is arranged in each shouldered portion to receive one end of the strip and hold it in position during the initial winding operation. Each vise or retainer has a portion 30 which overhangs the shoulder and bears against the outer face of the forward end of the strip, while the body portion of said retainer is provided a suitable distance from said shoulder with a plurality of outwardly and forwardly presented teeth 31 which are adapted to bite into the inner side of the strip and hold the latter to the forming head during the rotation of the latter so that said strip is pulled forwardly by said head. A screw 32 and a washer 33 hold the retainer in position on the head (see Fig. 6). The strip A may be of any desired length and is fed forwardly to the forming head 20. It is supported in position adjacent to the rear end member 12 by a bracket 34 and adjacent to the forming head by an elongated shelf 35. Bracket 34 and shelf 35 are arranged in the same plane with forming head 20 so that said strip is guided and supported on a straight line with said head. Bracket 34 is fastened to the rear wall of end member 11 by a screw 36 and is adjustable in a vertical plane so as to maintain the strip in proper position with respect to the forming head. Said bracket is provided with a pair of upwardly presented spaced ears 34a which prevent lateral displacement of the strip at this point. An arm 37 is fixed at 38 to bracket 34 and overhangs said strip so that a roller 39 carried by said arm bears on the upper face of said strip and holds the latter against upward displacement (see Figs. 1 and 2).

The shelf 35 is pivotally supported at its rear end by a bolt 40. Rail 14 is channel-shaped in cross section and bolt 40 is screw-seated in one of the flanges thereof as indicated at 41 and is locked in position by locking nuts 42. The other end of said bolt is received in an apertured lug 35a formed integral with and depending from shelf 35. A nut 44 bears against one side of said lug while the other side is engaged by the head of the bolt so that said shelf is held against lateral movement on said bolt but can be adjusted laterally relative to said rail by loosening lock nuts 42 and moving said bolt longitudinally. Shelf 35 extends forwardly toward the forming head 20 and is provided at its forward end with a pair of upstanding spaced ears 45 which form a guide for the strip as it traverses said shelf.

In order to apply pressure to the strip as it is being wound or formed over the forming head 20 and to hold the convolutions formed by said shelf together and permit the adhesive to set, a chain 46 containing rollers 47 is wrapped around said forming head and bears against the outermost layer or convolution of the strip. One end of the chain is anchored to the front frame 11, as indicated at 48, and the other end of the chain is connected to a cable 49 whereby said chain is yieldably held at all times under proper tension in a manner hereinafter more fully described.

The rollers 47 are journaled on pins 50 between chain links 51 and provide a plurality of points for applying pressure to the strips wound on said forming head. One end of the chain has connected thereto a pair of links 52 which are spaced from each other a sufficient distance so as to clear said forming head and said chain 46 as shown in Figures 1 and 12. These links extend tangentially and downwardly from said forming head and the front ends of said links are pivotally attached to a casting 54 by a removable pin 55. Casting 54 is provided with a hook 56 which is adapted to engage an eye 57 secured to a Z-shaped bar 58. This bar is secured to one of the legs of front end member 11 by a bolt and nut fastening 59. The parts just described form the anchoring means 48 for the fixed end of the chain.

The other end of the chain extends tangentially and rearwardly under the forming head 20 and under the shelf 35 and is connected to the forward ends of a pair of spaced links 60, the rear ends of which are suitably connected to cable 49, as indicated at 61. The shelf 35 is formed of inverted U-shape in cross section and the downwardly presented flanges thereof form guides for links 60. The upwardly extending ears 45 formed at the forward end of shelf 35 are spaced a suitable distance apart to clear chain 46 and to clear links 52 which are located exteriorly of said ears (see Fig. 13).

Cable 49 extends rearwardly of the machine and passes over a sheave 62 which is mounted on a horizontally disposed shaft 64 to one side of rail 14 and substantially in the same plane with the forming head 20. Shaft 64 is adjustably held in a lug 65 depending from rail 14 by nuts 66. The cable 49 after passing over said sheave extends downwardly and has its lower end pivotally connected to a U-shaped strap or attaching member 67.

A lever 68 is disposed horizontally in the lower end of the frame 10 between end members 11 and 12 and is fulcrumed at 69 adjacent to rear end member 12. Member 67 is slidably mounted on said lever so that it can be adjusted relatively to the fulcrum thereof. A set screw 70 secures said member 67 in position on said lever. The forward end of said lever is weighted by a weight 71 and this weight is slidable or adjustable on said lever and is locked in adjusted position by set screws 72. Thus the weight on said lever maintains the chain 46 under proper tension. As the diameter of the chain on said forming head increases due to the convolutions of the strips wound on said forming head, the distance between the cable connections 61 and said forming head is shortened thereby pulling said cable 49 upwardly and forwardly and causing lever 68 to be raised on its fulcrum 69.

As the pivotal movement of lever 68 is limited on account of the location of forming head 20 and the chain 46, I locate the fulcrum 69 on a movable member 74 and when the lever reaches its maximum pivotal position said fulcrum member 74 is gradually raised upwardly as the diameter of the material wound on said forming head 20 is increased.

Member 74 is in the form of a collar internally threaded and screw-seated on a vertically disposed screw 75. The lever 68 has its end bifurcated and is pivotally mounted on said collar by means of screws or fulcrum members 69 which are fixed to said collar and extend horizontally therefrom.

Screw 75 is revolubly supported in its lower end by a lug 76, extending from end member 12, and at its upper end by a U-shaped bracket 77. This bracket is secured to the underside of an extension of rail 14. The upper end of shaft 75 has fixed thereto a beveled gear 78 which meshes with a beveled gear 79 fixed to a horizontally disposed shaft 80 journaled in bearings formed in said bracket.

The rear end of shaft 80 extends rearwardly beyond end member 12 and has fixed thereon a sprocket wheel 81. Revolubly mounted in bearings formed in end members 11 and 12 is a horizontally disposed shaft 82. This shaft is located a suitable distance below rail 14. The rear end of said shaft extends beyond end member 12 and has fixed thereon a comparatively large sprocket wheel 83 and operating over this sprocket wheel and over the sprocket wheel 81 is a sprocket chain 84. A handle 85 is fixed to the end of shaft 82 for manual operation.

This shaft 82 has loosely mounted thereon near the front end member 11 a sprocket wheel 86 over which operates a sprocket chain 87, the upper end of which operates over a sprocket wheel 88 which is fixed to shaft 27. Thus the actuation of said shaft 27 by handle 28 or other actuating means not only operates forming head 10 but also the sprocket wheel 86. A collar 89 is fixed to shaft 82 and engages one side of the hub of the sprocket wheel. The other side of said hub forms a clutch member 90 which is adapted to be engaged by a clutch member 91 slidably mounted on shaft 82 and in non-rotative engagement therewith. Thus when said clutch member 91 is moved rearwardly into engagement with clutch member 90 shaft 82 is operatively interengaged with shaft 27 and is actuated simultaneously with the forming head 20. This actuation of shaft 82 sets in operation screw 75 in proper direction so as to move upwardly the fulcrums 69 of lever 68. When the clutch member 91 is disengaged from clutch member 90 shaft 82 and parts associated therewith are rendered stationary. Clutching means 90 and 91 are used to move the fulcrum 69 of lever 68 upwardly only. To return the lever to its normal position, handle 85 is operated to actuate screw 75 in reverse direction and bring the fulcrum 69 downwardly.

The engagement and disengagement of movable clutch member 91 with clutch member 90 is effected automatically by the upward movement of lever 68. Movable clutch member 91 is provided with a peripheral groove 92 which is engaged by an inwardly projecting annular rib 93 formed on a split collar 94. Fixed in said collar and extending radially therefrom in diametrically opposed directions are screws or pins 95 on which are pivotally mounted the bifurcated portions of a lever 96. This lever is fulcrumed at 97 to the front end member 11 and extends downwardly beyond the clutch members 90 and 91 and has its lower end pivotally connected to one end of a link 98, the other end of which is pivotally connected to one end of link 99.

The other end of link 99 is pivotally mounted on a stationary lug 100 which is formed integral with front end member 11 and projects rearwardly therefrom. The pivotal interengagement of links 98 and 99 is effected by a pin 101, one end of which projects from said links and occupies an elongated slot 102 formed in a horizontally disposed arm 104. This arm is formed integral with and projects rearwardly from a block 105, and the latter is slidably mounted in vertically disposed guides 106 arranged in front end member 11.

Preferably there are two links 98 arranged each to one side of link 99 and pin 101 may be fixed in one or both of said links 98 and loosely disposed in link 99.

Links 98 and 99 form a toggle joint which when block 105 is moved upwardly cause, through the interengagement of pin 101 with slot 102, the actuation of lever 96 so that clutch member 91 is moved into engagement with clutch member 90. This sets in operation shaft 82 and chain drive connection 81, 83 and 84 and operates screw 75 in proper direction, thereby moving upwardly collar or nut 74. As the lever 68 is pivotally mounted on said collar this end of said lever, as well as the member 67, will be raised, thereby permitting movement of cable 49 and the long links 60 toward the forming head and lengthening the chain portion encircling said forming head and the convolutions of strip wound thereon.

When the block 105 is allowed to move downwardly it moves the pivotal joint of links 98 and 99 (pin 101) downwardly, thereby moving lever 96 away from sprocket wheel 86 and breaking the operative connection between the clutch members 90 and 91.

To restore lever 68 to its normal position screw 75 has to be operated manually by means of handle 85 in proper direction so as to bring the collar 74 downwardly to its normal position as shown in Figure 1.

The means for operating block 105 upwardly comprise a block 107 which is slidably arranged in guides 106 in the lower end of end member 11. This block is provided with a central aperture through which extends the free end 68a of lever 68. As the lever 68 is moved upwardly on its fulcrum 69 it causes block 107 to move upwardly accordingly through the engagement with end 68a. In order to reduce friction, a roller 108 is revolubly mounted in the lower end of the aperture of said block and engages the lower edge of lever 68. A similar roller 109 is journaled in the upper end of said opening and is adapted to be engaged by the upper edge of said lever.

Formed integral with block 107 is a lug 110 in which is arranged a vertically disposed bore for receiving the lower end of a rod 111. This rod is held in place in said lug by a set screw 112. The upper end of said rod extends through a bore formed vertically in a lug 114 formed integral with block 105. The upper end of said rod is screw-threaded and receives a nut 115 which when said rod occupies depressed position bears on the upper end of lug 114. A coiled spring 116 is arranged on said rod 111 and the lower end of said spring rests on a collar 117 which is adjustably arranged on said rod. The upper end of this spring terminates a suitable distance from lug 114 and is adapted to engage the lower end thereof when block 107 is raised a sufficient distance upwardly. This spring forms a resilient connection which causes upward movement of block 105 when the lower block 107 is raised the requisite distance by lever 68.

After the strip or strips have been wound on forming head 20, the outer end of the strip is clamped in position by a clamp 118, whereupon the forming head and the strip wound thereon can be removed from the machine and set aside until the glue sets.

This clamp consists of an inverted U-shaped member 119, the ends of which are apertured to receive a bolt or pin 120 by means of which said member is secured to forming head 20, as shown in Figures 14 and 15. The upper or horizontal portion of member 119 is provided with a screw-threaded aperture, as indicated at 121, for receiving a screw 122. The end of this screw bears against the seat formed in the upper face of a clamping piece 123, the inner face of which is serrated or provided with teeth, as indicated at 124 for engaging the outermost layer of the strip. By turning the screw 122 in proper direction, said clamping piece is forced against said strip, preferably near the end B thereof, thereby holding the coiled strip or strips in position on the forming head.

A hook 125 is preferably secured to rail 14 near the support 15 and is adapted to receive the free ends of links 52, when the latter are disengaged from member 54 by the removal of pin 55.

The forming head 20 is detachable from shaft 17 and a head of any desired shape or size can be used.

When the forming head is in place, the chain 46 is passed over the periphery thereof with the links 52 straddling the chain and the lugs 45 of guide 35. The free ends of the links are fastened to anchor or block 48 by a pin 55.

A strip of wood or other pliable material is placed in guides 34 and 35 and its forward end is inserted into the vise or gripper 29. The forming head 20 is now actuated either by handle 28 or by a suitable grip in the direction indicated by arrow. The strip is momentarily held against the gripper 29 until teeth 31 thereof grip said strip and hold it.

After one convolution of the strip has been wound on the head a suitable adhesive is applied to the upper face of the strip so that the convolutions will adhere to each other. Where more than one strip is used, as in the instant case, the second strip is inserted when the next gripper 29 reaches the lowermost position and the adhesive is applied to the first strip before the positioning of the second strip.

The winding of the strip or strips on the forming head increases the periphery of the outermost convolution and this increases accordingly the length of the chain encircling the same. This increase in the length of the chain is permitted by virtue of the fact that the rear end of the chain is connected by links 60 and cable 49 to the weighted lever 68. Thus as the chain moves toward the forming head, the weighted lever 68 is raised on its fulcrum.

When said lever is raised to a predetermined position, clutch member 91, through the actuation of lever 96 and associated mechanism, is moved into engagement with clutch member 90, thereby setting in operation shaft 82 and through the connections thereof the vertically disposed screw 75 so that the fulcrum member 74 of said lever 88 is raised.

When this member 74 and the fulcrumed end of lever 68 is raised a sufficient distance, the weighted end 68a of said lever and the cylinder block 107 and parts carried thereby drop, thereby disengaging, by means of rod 111 and nut 115, clutch member 91 from member 90 and rendering shaft 82 and screw 75 inoperative.

The continued operation of the forming head 20 again raised the weighted end of lever 68 and block 107 and when the latter reaches the predetermined position, said shaft 82 and screw 75 is again operated to raise fulcrum member 74 and cause subsequent lowering of the slide block and the weighted end of the lever. Thus the raising or lowering of the lever and the intermittent operation of the screw 75 and of fulcrum member 84 is automatically repeated until the strip is wound on said head.

The forming head is now positioned so that the end of the strip is adjacent to and slightly to one side of the last roller 47 of chain 46. The clamp 118 is now placed in position and screw 122 thereof is tightened so as to secure said end of the strip in place.

Handle 85 is now actuated to raise the fulcrum end of the lever 68 and relieve the tension on chain 46, whereupon pin 55 is removed and the links 52 and chain 46 are released and removed from the forming head.

By detaching nut 22 and washer 21 from shaft 17 said forming head and the strip wound thereon can be removed and set aside until the glue or cement is dry and a new forming head placed in the machine and the latter set in operation.

I claim:

1. A ring forming machine comprising in combination a rotatable forming head adapted to have wound thereon a strip of pliable material, a flexible member encircling said head for applying pressure to the convolutions of material wound thereon, one end of said flexible member being bifurcated and held stationary and the other end extending through said bifurcated end in opposite direction thereto, a cable fixed at one end to the free end of said flexible member, a weighted lever having a fulcrum movable in vertical plane, the other end of said cable being connected to said lever for maintaining said flexible member under predetermined tension, and means for moving said movable fulcrum upwardly to compensate for the shortening of said flexible member as the diameter of the latter is increased on said forming head, thereby preserving the same tension exerted by said lever.

2. A ring making machine comprising a rotatable forming head, means on said head for gripping one end of a strip of pliable material and securing it thereto, whereby as said head is rotated said strip is wound in a plurality of convolutions on said head, a flexible pressure member encircling said head and in contact with the outermost layer of said strip, one end of said flexible member being bifurcated and the ends of said flexible member being crossed and extending in opposite directions, means for holding one end of said flexible member stationary, a weighted lever associated with the other end for maintaining said flexible member under predetermined tension and holding the convolutions of said strip under pressure against said forming head, and means for moving the fulcrum of said lever in accordance with the increase of convolutions on said head and in order to permit the automatic lengthening of the encircling portion of said flexible member and to compensate for the shortening of the distance between said lever and said forming head.

3. A ring making machine comprising a rotatable forming head, means on said head for gripping one end of a strip of pliable material and securing it thereto, whereby as said head is rotated said strip is wound over the peripheral face thereof, a chain member encircling said head and in contact with the outermost layer of said strip, one end of said chain being bifurcated and the ends thereof being crossed and extending in opposite directions, means for holding one end of said chain stationary, a cable connected to the other end of said chain, a weighted lever connected to the other end of said cable, a movable fulcrum for said lever, and means for actuating said forming head and said movable fulcrum simultaneously whereby said lever is raised to compensate for the shortening of the distance between said forming head and the point of connection of said chain with said cable and preserve at all times the same tension on said chain.

4. A ring forming machine comprising a rotatable forming head, means on the periphery of said head for gripping one end of a strip of pliable material whereby as said head is rotated said strip is wound in a plurality of convolutions on the peripheral face thereof, a flexible pressure member encircling said head and in contact with the outermost convolution of said strip of material, one end of said flexible member being bifurcated and the ends thereof being crossed and extending in opposite directions, means for anchoring one end of said flexible member, a cable attached to the other end of said flexible member, a weighted lever having the other end of said cable connected thereto for maintaining said flexible member under suitable tension, and means for adjusting the fulcrum of said lever to compensate for the increase in length of the portion of said flexible member encircling said rotatable head.

5. A ring forming machine comprising a rotatable forming head, means on the periphery of said head for gripping one end of a strip of pliable material whereby said strip is wound in a plurality of convolutions on the peripheral face of said head, a flexible pressure member encircling said head and contacting with the outer face of the outermost convolution of said strip, one end of said flexible member being bifurcated and the ends of said flexible pressure member being crossed and extended in opposite directions, one end of said flexible pressure member being fixed, a cable fixed at one end to the free end of said flexible member, a vertically disposed screw, a fulcrum member screw-threaded thereon, a weighted lever fulcrumed on said member and having the other end of said cable fixed thereto so as to maintain said flexible member under predetermined tension, and means for actuating said head and said screw simultaneously whereby said lever is moved upwardly in accordance with the increase in diameter of the portion of said flexible pressure member encircling said head.

6. A ring forming machine comprising in combination a rotatable forming head, means on the peripheral face thereof for gripping one end of a strip of pliable material whereby said strip is wound in convolutions on said head, a flexible pressure member encircling said head and in contact with the outer face of the outermost convolution of said strip, the ends of said flexible member being crossed and extended in opposite directions, one end being bifurcated and held stationary and the other end being movable and extending through said bifurcated end in opposite direction thereto, a cable attached at one end to said movable end of said flexible member, a weighted lever attached to the other end of said cable for yieldably maintaining the latter and said flexible member under requisite tension whereby the convolutions of said strip are held in contact with each other and with said forming head, a vertically disposed screw, a fulcrum member screw-threaded on said screw, and supporting said lever, and means for actuating said screw and moving said fulcrum member upwardly so as to raise said lever in accordance with the shortening of the distance between said forming head and the point of attachment of said flexible pressure member with said cable.

7. A ring making machine of the class described comprising in combination a support, a shaft revolubly mounted thereon, a forming head fixed on said shaft, means for actuating said shaft, a gripper on said head for securing one end of a strip of pliable material to the peripheral face of said head whereby said strip is wound thereon, and an articulated member encircling said head and including a plurality of revoluble rollers bearing at a plurality of points against said strip and pressing it against said head.

8. A ring making machine of the class described comprising in combination a support, a shaft revolubly mounted thereon, a forming head fixed on said shaft, means for securing one end of a strip of pliable material to the peripheral face of said forming head whereby said strip is wound thereon, an articulated member encircling said head and having one end fixed and the other yieldably held under pressure, and a plurality of rollers revolubly carried by said articulated member and forming anti-friction means for engaging the convolutions of said strip and pressing the latter against the peripheral face of said head.

9. In a machine of the class described, the combination with a revoluble forming head, of a chain attached at one end and yieldably held under tension at the other end, said chain encircling said head, and a plurality of rollers revolubly mounted at spaced points in said chain and engaging the peripheral face of said head and adapted to engage a strip wound thereon and hold it under pressure against said head.

10. In a machine of the class described, the combination of a forming head and an articulated member encircling the peripheral face thereof, a weighted lever, means connecting one end of said articulated member with said lever whereby the weight of the latter holds said articulated member yieldably under tension against said forming head, and means for raising the fulcrum of said lever in accordance with the shortening of the distance between said lever and said forming head, thereby preserving the same degree of tension.

11. In a machine of the class described, the combination with a forming head and a flexible member encircling the peripheral face thereof, of means for detachably anchoring one end of said flexible member, and means connected to the other end of said flexible member and yieldably maintaining the latter under pressure in engagement with the peripheral face of said forming head, said means including a cable connected to said flexible member, a weighted lever having the other end of said cable connected thereto to provide the necessary tension thereof, a vertically disposed screw, a fulcrum member screw-threaded on said screw and forming a fulcrum for said lever, and means for simultaneously actuating said forming head and raising said fulcrum member so as to preserve the same tension during the operation of said machine.

12. In a machine of the class described, the combination with a forming head and a flexible member encircling the same, of a fulcrum member movable in a vertical plane, a lever pivotally mounted on said fulcrum member, an operating connection between said flexible member and said lever whereby the weight of the latter holds said flexible member under pressure against said forming head and said lever is raised upwardly on its fulcrum as the encircling portion of said flexible member is increased in diameter, and means for moving said fulcrum member upwardly when said lever is raised to a predetermined position.

13. In a machine of the class described, the combination with a forming head and a flexible member encircling the same, of a fulcrum member, a weighted lever pivotally mounted on said fulcrum member and operatively connected to one end of said flexible member for maintaining the latter yieldably under pressure against said forming head, said lever being movable upwardly on said fulcrum as the diameter of said encircling portion is increased, and means automatically operable to raise said fulcrum member when said lever is raised to predetermined position.

14. In a machine of the class described, the combination with a forming head and a flexible member encircling the same, of a fulcrum member, a lever pivotally mounted on said fulcrum and operatively connected to one end of said flexible member, whereby the latter is held yieldably under tension against said forming head by said lever, said lever being movable upwardly on its fulcrum by said flexible member as the length thereof wound on said forming head increases, mechanism for actuating said fulcrum member, and means for setting said mechanism in operation when said lever is raised to predetermined position and for rendering said mechanism inoperative when said lever drops on its fulcrum to a predetermined lower position.

15. In a machine of the class described, the combination with a forming head and a flexible member encircling the same and adapted to press a strip of yieldable material against the peripheral face thereof, of a fulcrum member movable in a vertical plane, a weighted lever pivotally mounted at one end on said fulcrum member, operative connections between said lever and one end of said flexible member, the other end of said flexible member being anchored whereby the weight of said lever maintains said flexible member under pressure against said forming head and said lever is movable upwardly on its fulcrum as the portion of said flexible member encircling said forming head increases in length, mechanism for moving said fulcrum member upwardly, and means associated with the free end of said lever for rendering said mechanism operative when said lever is raised on its fulcrum to a predetermined position and for rendering said mechanism inoperative when said lever is dropped from its raised position.

16. In a machine of the class described, the combination with a flexible member adapted to hold a strip of flexible material against a forming head, of a vertically disposed screw, a nut screw-threaded thereon, a lever pivotally mounted at one end on said nut, an operative connection connecting one end of said flexible member with said lever whereby the weight of the latter holds said flexible connection yieldably under tension, mechanism including a clutch for actuating said screw and raising said fulcrum member of said lever, and means associated with the free end of said lever for interengaging said clutch and effect upward movement of said fulcrum member when the free end of said lever occupies predetermined raised position and for disengaging said clutch and rendering said fulcrum member stationary when said free end of said lever occupies a predetermined lowered position.

MICHAEL WIMER.